United States Patent

[11] 3,607,395

| [72] | Inventor | Alan William Stephenson |
| | | Victoria, Australia |
| [21] | Appl. No. | 777,168 |
| [22] | Filed | Nov. 19, 1968 |
| [45] | Patented | Sept. 21, 1971 |
| [73] | Assignee | Sidney Cooke Chemicals Pty. Ltd. |
| | | Brooklyn, Victoria, Australia |
| [32] | Priority | Aug. 14, 1968 |
| [33] | | Australia |
| [31] | | 42,116/68 |

[54] STARCH HYDROLYSIS
6 Claims, No Drawings

[52] U.S. Cl. .................................................. 127/38, 127/29
[51] Int. Cl. .................................................. C13l 1/10
[50] Field of Search ....................................... 127/38, 29

[56] References Cited
UNITED STATES PATENTS

| 642,329 | 1/1900 | Higgins............................. | 127/38 X |
| 642,330 | 1/1900 | Higgins............................. | 127/38 X |
| 642,331 | 1/1900 | Higgins............................. | 127/38 X |

Primary Examiner—Morris O. Wolk
Assistant Examiner—Sidney Marantz
Attorney—Sughrue, Rothwell, Mion, Zinn & Macpeak ABSTRACT: A method in which starch is hydrolysed by adding it to an acidified medium, containing from about 1 to about 5 percent by weight of mineral acid based on the weight of starch to be hydrolysed, at a temperature above about 80° C. and over a period of from about 5 to about 30 minutes, and allowing the starch to hydrolyse for a period of from about 10 to about 90 minutes thereby to produce a dextrine solution suitable for use in adhesives.

STARCH HYDROLYSIS

BACKGROUND OF THE INVENTION

1 Field of the Invention

This invention relates to the hydrolysis of starch.

Raw starch is substantially insoluble in cold water but may be hydrolyzed and, as hydrolysis proceeds, its solubility in cold water increases until it becomes completely soluble. If the hydrolysis is carried sufficiently far, glucose is obtained. Starches which have been hydrolyzed, but not to the extent of being broken down into sugars, are known as dextrines.

Dextrines are used in the manufacture of adhesives and are made in varying grades having a solubility in cold water ranging from 10 percent to 100 percent and are used as solutions having a range of solids content. By choosing different grades of dextrines and making up solutions having different solids content it is possible to manufacture a wide range of adhesives having different drying and tackiness parameters.

2. Description of the Prior Art

At the present time it is known to produce dextrines by dry roasting of starch, in the presence of a catalyst or by heat alone, to hydrolyze the starch. The hydrolysis reaction may be stopped at any time by discontinuing the roasting and, by selecting the time for stopping hydrolysis, dextrines having different solubilities may be obtained.

The dry roasting process produces dextrines of high quality and is easily controlled, however, it is relatively expensive and recently it has become usual to produce dextrines by wet methods.

In one such method of hydrolyzing starch, an enzyme, usually an alpha-amylase, sometimes with other enzymes, is added to a starch and cold water slurry. Normally the water content of the slurry is adjusted so that the solids concentration is from 20 to 40 percent by weight. The slurry is then heated to about the gelatinization temperature of starch (60° C). At that temperature, the starch gelatinizes, the viscosity of the mixture increases substantially and the mixture becomes correspondingly difficult to stir. However, the gelatinized starch is hydrolyzed by the enzyme with a resultant decrease in the viscosity of the mixture. As the hydrolysis proceeds, the viscosity falls until a limiting viscosity is reached or the hydrolysis is stopped e.g., by deactivating the enzyme with chemicals or heat.

In the above process, hereinafter called "the enzyme process", care must be taken not to heat the mixture above the temperature at which the enzyme is deactivated.

The enzyme process has the following disadvantages:

(a) The enzyme, with age, may lose all or part of its ability to hydrolyze starch.

(b) The enzyme may be poisoned by certain chemicals and care must be taken to ensure the absence of such chemicals.

(c) The increase in viscosity consequent on gelatinization of the starch makes stirring of the mixture very difficult with the result that:

(i) Strong, and therefore expensive, stirring equipment is required. strong.
not
(ii) Nonuniform hydrolysis of the starch is brought about if the stirring is insufficiently strong. (iii) It is no commercially possible to hydrolyze starch-water slurries containing substantially more than 40 percent solids.

(d) The color of the resultant dextrine solution is whitish and is less clear than a dextrine solution of equivalent solubility and solids concentration made from dextrine produced by the dry roasting process.

(e) Adhesives manufactured from the resultant dextrine solution develop tack more slowly than, and are less tacky than, an adhesive made from a dextrine solution having equivalent solubility and solids concentration and made from dextrine produced by the dry roasting process.

In another known method of wet hydrolysis, sulfuric or other mineral acid, usually in an amount of 8 to 12 percent by weight, is added to a starch-water slurry and the mixture is heated to about the gelatinization temperature of starch (60° C.). At such a temperature, the starch gelatinizes, the viscosity of the mixture increases substantially and the mixture becomes correspondingly difficult to stir.

The gelatinized starch is progressively hydrolyzed by the acid with resultant decrease in the viscosity of the mixture. As the hydrolysis proceeds, the viscosity falls until a limiting viscosity is reached or the hydrolysis is stopped by neutralizing the acid.

This process, hereinafter referred to as "the acid process" has the disadvantages (c) to (e) set out above in respect of the enzyme process but, in addition, has the following disadvantages:

(a) At least 8 percent by weight of acid is necessary if the hydrolysis is to proceed in a reasonable time and this quantity of acid has the following effects:

(i) Corrosion of the vessel in which the hydrolysis takes place and corrosion of ancillary equipment.

(ii) The acid must be neutralized after the hydrolysis and this results in the resultant dextrine solution containing salts which may crystallize out or adversely affect the properties of the adhesive to be made.

Whilst both the enzyme and acid processes produce dextrine solutions, it is found that the quality thereof is not so high as to allow them to be used for making all types of adhesive compositions and it is necessary that about 75 percent of all types of adhesive compositions be made from dextrines obtained by the dry roasting process.

Of the problems associated with the enzyme and acid processes it is our belief that the viscosity produced on gelatinization of the starch and the consequences thereof are of greatest importance and it is an object of this invention to provide a method of hydrolyzing starch which will not result in a substantial increase in the viscosity of the slurry to be hydrolyzed.

SUMMARY OF THE INVENTION

This invention provides a method of producing a dextrine solution which comprises heating an acidified aqueous medium to a temperature above about 80° C. and adding starch thereto over a period of time. Preferably, the starch is added to the acidified medium at a rate not substantially in excess of about three times the rate at which it hydrolyzes.

In another aspect, this invention provides a dextrine solution obtained by the above described process.

The preferred amount of acid to be used is from about 1 to about 5 percent by weight based on the weight of starch to be hydrolyzed and it should be noted that this is substantially less than the 8 to 12 percent usually used in the acid process. Suitable acids include hydrochloric, nitric and sulfuric acids.

After the production of the dextrine solution, modifiers such as alkalies, plasticizers fillers and tack promoters may be added.

Cold water may be added to the dextrine solution after its production to speed up the cooling thereof and this is preferred as otherwise the color of the dextrine solution may darken.

The time taken for the hydrolysis to reach a given degree depends on the temperature of the reaction mixture and the acid concentration, but we have found that it is preferable for the starch to be added over from about 5 to about 30 minutes and for the hydrolysis reaction, from the commencement of the addition of starch, to be allowed to proceed for from about 10 to about 90 minutes.

By controlling the temperature, time of reaction and acid concentration, dextrine solutions of different properties may be obtained.

We prefer to use wheat, maize or tapioca starch. If desired, however, flour, particularly low protein flour, may be used.

In this respect it should be noted that when treating flour, particularly low protein flour, it is not essential that the starch and gluten be separated: if desired, ground flour can be treated by the process of this invention.

DETAILED DESCRIPTION OF THE INVENTION

This invention will be illustrated by the following examples in which all parts and percentages, unless specifically stated otherwise, are by weight.

EXAMPLE I 1700 lb., of water was heated in a stainless steel reaction vessel by injection of steam to 95° C. and 16. 8 lb. of 70 percent nitric acid were added and stirred in. Twelve 140 lb., bags of wheat starch were added, with continuous stirring, to the vessel at a rate of 1 bag every 30 seconds (i.e., this addition of starch extended over a period of 6 minutes). As a result of the addition of starch, the temperature of the mixture in the vessel dropped to 90° C. Heating was maintained during the addition of starch to prevent the temperature of the mixture from falling below 90° C.

When the addition of starch was complete, the heating was maintained and after 6 minutes the temperature of the mixture had risen to 95° C. The mixture was maintained at 95° C. for 5 minutes and then the viscosity of the mixture was measured. As this was satisfactory, the hydrolysis was stopped by neutralizing the acid with 22 parts of 35 percent caustic soda. The mixture was then allowed to cool.

The resulting dextrine solution had a solids content of 43 percent and a viscosity of 60,000 c.p.s. and was suitable for use as an adhesive without further modification or addition.

EXAMPLE II 45 parts of water and 1 part of 70 percent nitric acid were heated to boiling in a stainless steel vessel and 48 parts of wheat starch were added thereto over 5 minutes. During the addition of starch the temperature of the mixture in the vessel was not allowed to drop below 95° C. and was maintained between 98° C. and 100° C. during a substantial proportion of the time taken to add the starch.

After the addition of starch was complete, the mixture was heated at above 98° C. for 5 minutes and then the viscosity of the mixture was measured and found to be satisfactory. The hydrolysis was then stopped by the addition of 1.3 parts of 35 percent caustic soda.

The resulting dextrine solution was then allowed to cool to 60° C. and, when at that temperature, 7 parts of borax, 1.4 parts of 35 percent caustic soda and 0.5 parts of a preservative were added.

The borax reacted with the hydroxyl groups on the hydrolyzed starch, the reaction being assisted by the caustic soda, to form a cross-linked product having an increased viscosity compared with that prior to the addition of borax.

The resulting product was a dextrine solution suitable for use as an adhesive without further modification or addition and had a solids content of 43 percent and a viscosity of 13,800 c.p.s.

EXAMPLE III

The procedure described in example II above was repeated except that the starch was added over 15 minutes and the mixture was heated for 10 minutes after the addition of starch was complete.

A dextrine solution having a solids content of 43 percent and a viscosity of 5,000 c.p.s. was obtained and was suitable for use as an adhesive without further modification or addition.

EXAMPLE IV

The general procedure described in example II was followed down to the neutralization of the nitric acid except that 54 parts of starch, 43 parts of water and 1.2 parts of acid were used, the mixture was not allowed to drop below 85° C. or to rise above 90° C., the heating after the addition of starch was complete was continued for 5 minutes, the acid was neutralized 5 minutes after the addition of the starch was complete by 1.5 parts of 35 percent caustic soda and no borax, additional caustic soda or preservative were added.

The solids content of the resulting dextrine solution was 54 percent and the viscosity was 60,000 c.p.s. The resulting dextrine solution was suitable for use as an adhesive and was of the dextrine "gum" type, relatively high in solids, had a soft pasty thixotropic consistency and did not substantially thicken or "paste up" with age and thus had a relatively long shelf life.

EXAMPLE V

The procedure described above in Example IV was followed except that 27 parts of wheat starch, 30 parts of water and 0.3 parts of 70 percent nitric acid were used, the starch was added over 15 minutes, heating after the addition of starch was complete was continued for 15 minutes and the acid was neutralized by the addition of 0.35 parts of 35 percent caustic soda.

The dextrine solution thus obtained was modified by the addition thereto of 4.5 parts of sucrose, 0.4 parts of preservative and 39 parts of a dextrine obtained from potatoes to increase the solids content and tack properties.

The resultant dextrine solution was suitable for use as an adhesive without further modification or addition and had a solids content of 63 percent and a viscosity of 3,000 c.p.s.

The processes described above by way of example are relatively simple and easy to carry out and have the particular advantage that as the starch is added over a period of time (the whole of the starch not being heated to the gelatinization temperature at the same time as is done in the acid enzyme processes) the amount of starch which is in a gelatinized state at any one time is small relative to the amount of starch which is hydrolyzed over the period of the reaction. Hence, as compared to a process in which the same amount of starch is raised all at the one time to the gelatinization temperature, the viscosity which occurs is substantially less and the mixture is correspondingly easy to stir.

Further, as a result of the viscosity not increasing as much as in the acid or enzyme processes, a greater amount of starch may be hydrolyzed and hence dextrine solutions having a solids content in excess of 40 percent may be prepared. This should be compared with the acid and enzyme processes where the upper limit is about 40 percent solids. Thus we have found that dextrine solutions of up to 65 percent solids may be prepared by the process of this invention.

Still further, as a result of the starch being added over a period of time, it is possible to achieve a degree of control greater than that obtainable with the acid and enzyme processes.

Also, as a result of the viscosity not increasing as much as in the acid or enzyme processes, less powerful stirring equipment is required, the temperature of the mixtures may be raised to above 80° C. (for efficient and speedy reaction it is essential that this be done) and hence the reaction proceeds more quickly.

Another advantage of the process of this invention is that the time taken for the reaction from the commencement of addition of starch is shorter than the time taken in the acid and enzyme processes from the time when the mixture has reached the gelatinization temperature of the starch.

We have found that dextrine solutions prepared in accordance with this invention can be used to replace a substantial proportion of the dextrines, obtained by dry roasting starch, which we have hitherto used in adhesive formulations. In addition, we have found that dextrine solutions prepared in accordance with this invention can replace up to 50 percent of the potato-derived dextrines used in some adhesive formulations.

We have also found that dextrine solutions having a wide range of properties may be prepared by the process of this invention. For instance, reaction for a relatively short time at a relatively low temperature produce relatively heavy bodied pasty solutions with relatively high viscosity and relatively low tack and which are relatively slow drying (because solids must be relatively low to obtain a workable viscosity), whereas if the temperature of reaction is relatively high and the reaction is allowed to continue for a relatively long time, a solution is produced which is relatively clear and thin-bodied, has relatively low viscosity and high tack, and which is relatively fast drying (because solids may be relatively high and the type of dextrine produced under these conditions is relatively tackier). However, it should be noted that if the reaction is carried sufficiently far to produce a substantial proportion of reducing sugars, the dextrine solution will be relatively slow drying.

It is to be understood that modifications and adaptations may be made to the processes above described without departing from the spirit and scope of this invention which includes every novel feature and combination of features herein disclosed.

I claim:

1. A process for producing a dextrine solution which comprises the steps of
   1. heating an acidified aqueous medium to a temperature within the range of 80° C. to the boiling temperature of the medium;
   2. progressively adding a quantity of starch to said medium while continuing to apply heat to said medium, said starch being added over a period of time of from 5 to 30 minutes and at a rate such that the temperature of said medium does not fall below 80° C.;
   3. continuing to heat said medium after all the starch has been added in order to maintain the temperature within the range of 80° C. to the boiling temperature of the medium;
   4. allowing hydrolysis of the starch to proceed within said temperature range until the viscosity of said medium reached a value indicative of the desired viscosity of the end product; and
   5. thereafter terminating the hydrolysis.

2. A process for producing a dextrine solution which comprises the steps of
   1. heating an acidified aqueous medium to a temperature within the range of 90° C. to the boiling temperature of said medium;
   2. progressively adding a quantity of starch to said medium while continuing to apply heat to said medium, said starch being added over a period of time of from 5 to 30 minutes and at a rate such that the temperature of said medium does not fall below 90° C.;
   3. continuing to heat said medium after all the starch has been added in order to maintain the temperature within the range of 90° C. to the boiling temperature of the medium;
   4. allowing hydrolysis of the starch to proceed within said temperature range until the viscosity of said medium reaches a value indicative of the desired viscosity of the end product; and
   5. thereafter terminating the hydrolysis.

3. A process as claimed in claim 2, in which the amount of acid in said medium does not exceed the molar equivalent of 5 percent by weight of 70 percent $HNO_3$ based on the total weight of the starch present in said medium.

4. A process as claimed in claim 3, in which the starch is added to said medium over a period of time of from 5 to 15 minutes.

5. A process as claimed in claim 3, in which the starch is added to said medium over a period of time of from 5 to 6 minutes.

6. A process as claimed in claim 3, in which said medium is maintained at a temperature of at least 95° C. during and after the addition of starch.